United States Patent
Uppunda et al.

(10) Patent No.: US 6,678,728 B1
(45) Date of Patent: Jan. 13, 2004

(54) METHOD AND APPARATUS FOR AUTOMATICALLY LOADING DEVICE STATUS INFORMATION INTO A NETWORK DEVICE

(75) Inventors: Krishna Uppunda, Santa Clara, CA (US); Eric Davis, Sunnyvale, CA (US); Nathaniel Henderson, San Jose, CA (US); Chi-Lie Wang, Sunnyvale, CA (US); Alexander Herrera, Austin, TX (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/454,783

(22) Filed: Dec. 3, 1999

(51) Int. Cl.$^7$ .............................................. G06F 15/177
(52) U.S. Cl. ...................... 709/222; 709/220; 709/221; 710/8; 710/10; 710/104
(58) Field of Search ................................ 709/222, 220, 709/221; 710/104, 8, 10

(56) References Cited

U.S. PATENT DOCUMENTS

| | | | | |
|---|---|---|---|---|
| 5,388,224 A | * | 2/1995 | Maskas | |
| 5,404,544 A | * | 4/1995 | Crayford | 713/310 |
| 5,559,794 A | * | 9/1996 | Willis et al. | 370/463 |
| 5,777,601 A | * | 7/1998 | Baker et al. | 345/603 |
| 5,809,331 A | * | 9/1998 | Staats et al. | |
| 6,185,630 B1 | * | 2/2001 | Simmons | 710/10 |

* cited by examiner

Primary Examiner—Frantz B. Jean
(74) Attorney, Agent, or Firm—McDonnell Boehnen Hulbert & Berghoff

(57) ABSTRACT

A method and apparatus for automatically loading device status information into a network device. One embodiment comprises an apparatus in a network device, wherein the network device enters a sleep state under particular conditions. In one embodiment, the apparatus is for communicating with other devices on the network and comprises control circuitry that controls communication between the network device and the other devices on the network. The apparatus further comprises a memory device that stores configuration data for the control circuitry, wherein at least a portion of the configuration data is loaded into the control circuitry upon initialization of the network device. The apparatus further comprises a buffer that stores keep-alive data that is transmitted to a plurality of the other devices in the network to refresh the presence of the network device in the network, wherein the keep-alive data is loaded into the buffer from the memory device upon initialization of the network device.

2 Claims, 2 Drawing Sheets

METHOD AND APPARATUS FOR AUTOMATICALLY LOADING DEVICE STATUS INFORMATION INTO A NETWORK DEVICE

FIELD OF THE INVENTION

The invention is in the field of automatically configuring integrated circuit devices.

BACKGROUND OF THE INVENTION

For a network system to operate, devices in a network must communicate their status to each other under various circumstances. For example, if device A wishes to transmit data to device B, device A may need to know whether device B can currently receive data. In this circumstance, and many others, a device may first need to know whether another device is in an active state, or has an active status. In some networks, routing tables list all active devices in the network. If a device has not been active in receiving or transmitting data for some period, such as when the device is powered down (in a "sleep" state), the device may be removed from the routing table. When a device is removed from the routing table, the router that removed it no longer knows the device exists. To prevent this from occurring, some network devices periodically transmit data over the network to inform other network devices that they are still on the network. The data may be so-called "keep-alive" packets formatted according to a predetermined protocol.

One way of using keep-alive packets is to store the packets in a transmit first-in-first-out (FIFO) buffer that is used for staging data to be transmitted over the network. The keep-alive packets are periodically transmitted when the network device is in a sleep state. A shortcoming of this scheme is that, should the power to the network device temporarily be lost, for example as a result of a power surge, the FIFO buffer is emptied. When power is restored to the network device and the network device enters a sleep state, the device may be removed from network routing tables because no keep-alive packets are transmitted.

Other data besides keep-alive packets may be stored in the transmit FIFO for use in a sleep state. For example, alert packets may be transmitted from the transmit FIFO to a remote network component in the event of abnormal conditions detected in the network device. Wake up patterns may also be stored in the transmit FIFO. Wake up patterns are patterns of data that are compared to data entering the network device, for example through a receive FIFO. The wake up patterns match data that, when received by the network, requires a response from the device. When a match is found between the wake up patterns stored and the data received, an appropriate signal is sent to cause the network device to exit the sleep state.

Prior schemes for storing status data in the transmit FIFO have several disadvantages. The status data is typically stored in the transmit FIFO by network driver software. The types of data stored are limited in that, if it is desired to change the data stored, the network driver must be changed. Another disadvantage is that requiring the network driver to load the status information increases network driver overhead. Another disadvantage is that status data lost from the transmit FIFO on power loss is usually not restored when power is restored.

SUMMARY OF THE DISCLOSURE

A method and apparatus for automatically loading status information into a network device is disclosed. One embodiment comprises an apparatus in a network device that enters a sleep state under particular conditions. The apparatus comprises a buffer for storing data that is to be transmitted. The apparatus also comprises a memory device that stores configuration data for the apparatus. The configuration data is loaded to the apparatus each time the network device is powered up. In one embodiment, keep-alive data is stored in the memory device so that it too will be loaded to the apparatus each time the network device is powered up. In one embodiment, the apparatus is for communicating with other devices on the network and comprises control circuitry that controls communication between the network device and the other devices on the network. The apparatus further comprises a memory device that stores configuration data for the control circuitry, wherein at least a portion of the configuration data is loaded into the control circuitry upon initialization of the network device. The apparatus further comprises a buffer that stores keep-alive data that is transmitted to a plurality of the other devices in the network to refresh the presence of the network device in the network, wherein the keep-alive data is loaded into the buffer from the memory device upon initialization of the network device.

DETAILED DESCRIPTION

Figure 1:
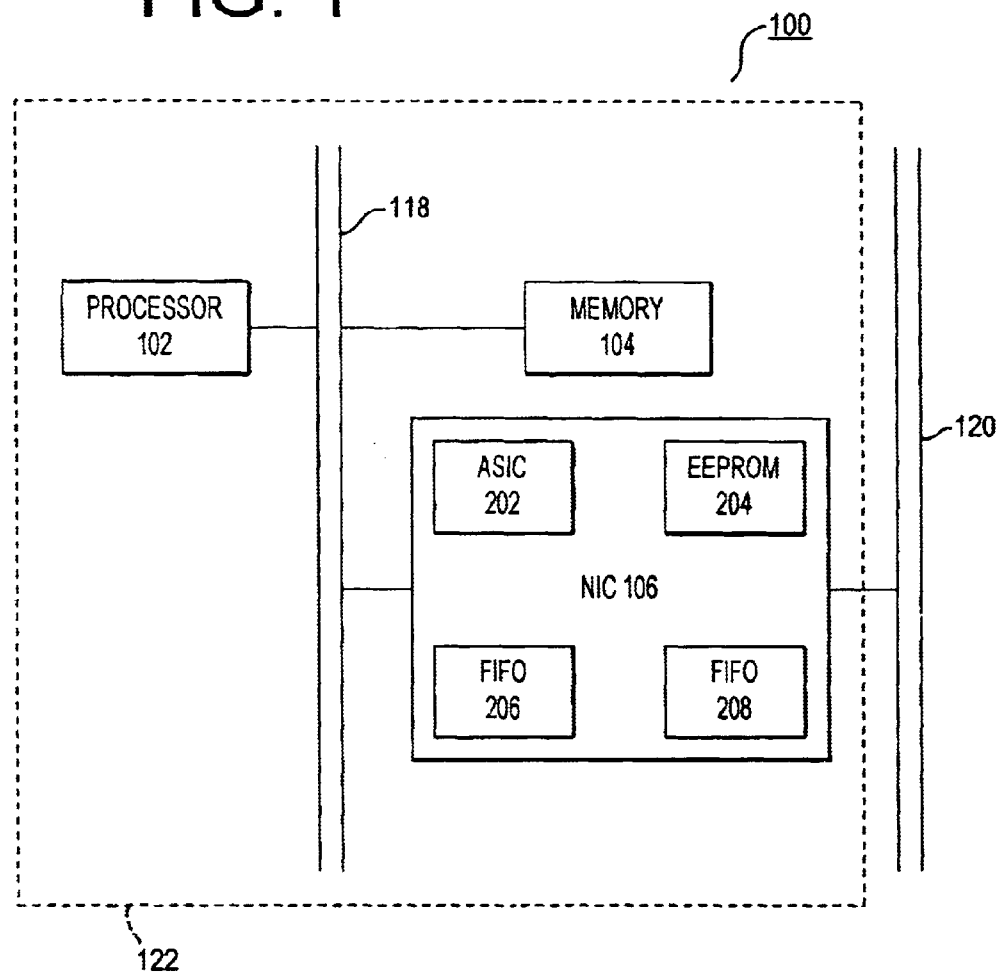
FIG. 1 is a block diagram of a portion of a network.

FIG. 1 is a block diagram of a portion of a network 100. Network 100 in various embodiments, may include a wide area network (WAN), a local area network (LAN), or any other collection of electronic devices that communicate via a physical or non-physical signal carrier. The network 100 has a physical network signal carrier 120. Other embodiments may use satellite or radio frequency signal transmission. In the network 100, any network protocol may be used. For example, transmission protocol over internet protocol (TCP/IP), Ethernet protocol, asynchronous transmission mode (ATM), integrated services digital network (ISDN), and digital subscriber line (DSL) may all be used.

Network signal carrier 120 connects multiple network devices. For simplicity, only one network device, personal computer (PC) 122, is shown in FIG. 1. PC 122 includes a processor 102 and a memory 104. PC 122 also includes a memory 104. PC 122 may include any combination of known peripheral devices (not shown), such as display devices, input devices and video devices. Processor 102, memory 104 and any peripheral devices communicate via bus 118. The bus 118 may be any type of PC bus according to a specific architecture. In one embodiment, the bus 118 is a peripheral component interconnect (PCI) bus. The PC 122 further includes a network interface card (NIC) 106 that is connected to the PCI bus 118 and to the network signal carrier 120. The NIC 106 includes circuitry for controlling communication between the PC 122 and any other entity on the network 100. NIC 106 includes an application specific integrated circuit (ASIC) 202, a receive first-in-first-out buffer (FIFO) 206 and a transmit FIFO (208). In other embodiments, NIC 106 could be external to the PC 122 or it may reside on a different bus than PCI bus 118. For example, in other embodiments with different bus architectures, PC 122 may include a video bus for a video peripheral (not shown) and a network bus for the NIC 106.

Figure 2:
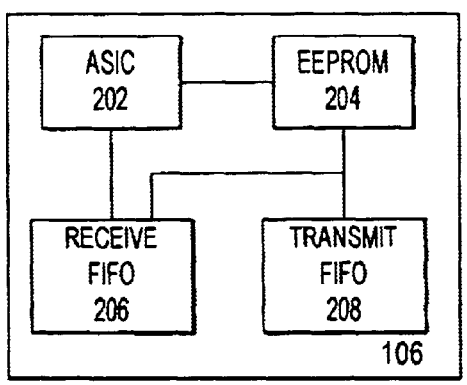
FIG. 2 is a block diagram of a network interface controller.

FIG. 2 is a block diagram of the NIC 106. Receive FIFO 206 temporarily stores incoming data received from other devices on the network 100. When the PC 122 is in a sleep state, transmit FIFO 208 is loaded with keep-alive packets. The keep-alive packets are periodically transmitted over the network signal carrier 120 to inform a router or routers that the PC 122 is on the network 120 and should not be removed from routing tables. In the event power to the PC 122 is unexpectedly lost, the keep-alive packets are usually lost from the transmit FIFO 208. As will be explained more fully below, in one embodiment of the present invention, keep-alive packets, and other status data, are automatically reloaded to the transmit FIFO 208 on power up of the PC 122 following a power interruption.

ASIC 202 includes circuitry that controls the operation of the NIC 106. ASIC 202 is designed to control communications between the network signal carrier 120 and the PC 122 for the particular architecture of PC 122 and the particular network protocol used in the network 100. ASIC 202 has a degree of flexibility in its operation. Some configuration data may be loaded into registers of the ASIC 202 to change its operation. Some of the configuration data is stored in the serial electrically erasable programmable read only memory (EEPROM) 204. Whenever the PC 122 is initialized, ASIC 202 automatically loads the configuration data from the EEPROM 204 to the ASIC 202. In one embodiment, a state machine in the ASIC 202 controls the loading of configuration data. In one embodiment of the invention, keep-alive packets and other status data are also stored in the EEPROM 204 and are automatically loaded to the transmit FIFO 208 whenever the PC 122 is initialized. In this way, the ability of the PC 122 to communicate its status to other devices on the network 100 is not impaired after an unexpected power interruption.

Keep-alive packets are packets that are stored in the transmit FIFO 208 are periodically transmitted over the network signal carrier 120 when the PC 122 is in a sleep state. Other types of status information that is stored in the EEPROM 204 and automatically loaded into the transmit FIFO 208 on initialization include alert packets and wakeup patterns. Alert packets are packets that are transmitted over the network to a remote device in the case of predetermined abnormal conditions in the PC 122. Wake up patterns are compared to packets received in the receive FIFO while the PC 122 is in a sleep state. The comparison is performed by control circuitry of the ASIC 202. The wake up patterns are chosen to match data that, when received by the PC 122, requires some kind of action on the part of the PC 122. When a match is found by the comparison, a signal is generated to cause the PC 122 to exit the sleep state so that the required action may be taken. Because the wake up patterns and alert packets are stored in the transmit FIFO by the ASIC 202 at initialization, overhead is reduced for the network driver. Any type or combination of types of status data may be loaded into the transmit FIFO 208 as described herein.

Figure 3:
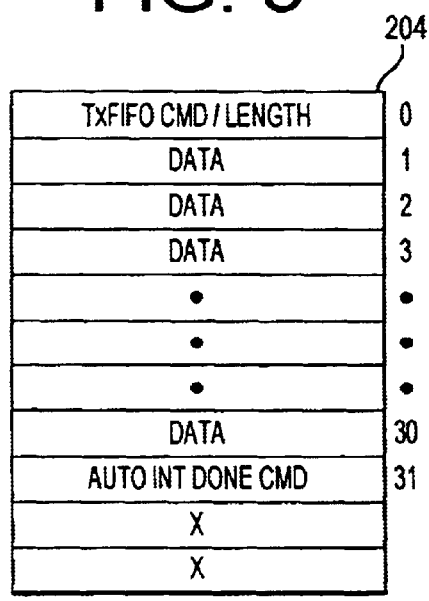
FIG. 3 is a block diagram of a serial electrically erasable programmable read only memory (EEPROM).

FIG. 3 shows some of the addressed locations of EEPROM 204. Address 0 stores a transmit command "TxFIFOCmd". The transmit FIFO command is read by a state machine that reads the EEPROM 204 at initialization. In one embodiment, the transmit FIFO command indicates that an Ethernet packet will follow. The transmit FIFO command also indicates the number of bytes (e.g., 60 bytes) to be written to the transmit FIFO 208. The next 30 addresses 1 to 30 store data to be loaded to the transmit FIFO 208 corresponding to a byte count of 60 bytes. Address 31 of the EEPROM 204 stores an "AutoInitDone" command which indicates the end of the EEPROM 204 initialization. All addresses in the EEPROM 204 after address 31 are shown as "don't cares". In some embodiments, more than one Ethernet packet may be stored in the EEPROM 204 for loading into the transmit FIFO 208. In that case, the address after the final data address (address 31 in FIG. 204) holds a new transmit FIFO command. The transmit FIFO command is 16 bits wide and has the following format.

[15:13] Encoded Command

111-AutoInitDone: EEPROM has completed initialization

001-TxFIFO Write

000-Reserved for future expansion

[12] Word Access

0-Byte

1-Word

[11] Reserved for future expansion

[10:0] Tx Byte count: number of bytes to be written into the TxFIFO

The most significant three bits [15:13] indicate the encoded command as shown in the command format above. The encoded command can be a transmit FIFO command or it could be an AutoInitDone command which indicates the end of EEPROM 204 initialization. The next bit [12] indicates whether a byte or word is being written. Bits [10:0] indicate the "Tx Byte count" which is the number of bytes to be loaded to the transmit FIFO 208. The word(s) following the transmit FIFO command word is the data to be written to the specified location.

Figure 4:
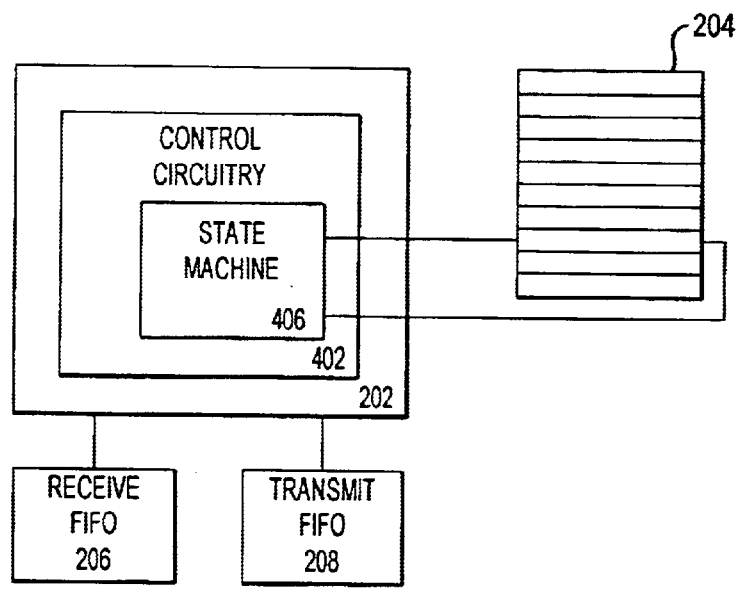
FIG. 4 is a block diagram of network interface controller control circuitry.

FIG. 4 is a block diagram of ASIC 202 showing control circuitry 402 and state machine 406.

Figure 5:
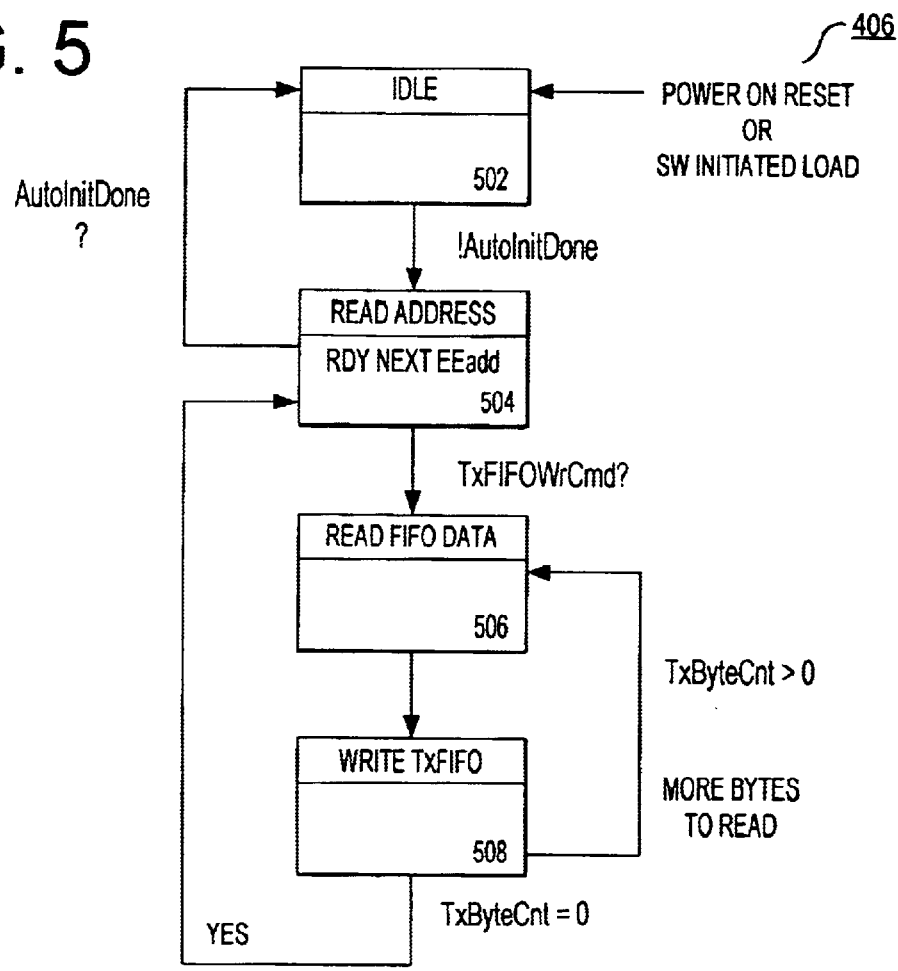
FIG. 5 is an illustration of a state machine of the network interface controller control circuitry.

FIG. 5 is a diagram of one embodiment of the state machine 406. State machine 406 has four states. State 502 is an idle state. State machine 406 is in the idle state 502 before receiving a power on reset signal or a software initiated load signal. State machine 406 also enters the idle state 502 when an AutoInitDone command is read.

If AutoInitDone is not true, the state machine 406 enters the read address state 504 in which the contents of the address currently pointed to in the EEPROM 204 are read. If the contents are an AutoInitDone command, the state machine 406 enters the idle state 502. If the contents are a transmit FIFO command, the FIFO data is read from the subsequent address in state 506. In state 508, the data is written to the transmit FIFO 208. If the byte count is zero, all the data referred to in the transmit FIFO command has been written to the transmit FIFO 208, and the state machine enters state 504 and readies the next address to be read. If the byte count is not zero, there is additional data to be read from the EEPROM 204 and written to the transmit FIFO 208. In this case, the state machine enters state 506 and reads more FIFO data.

A method and apparatus for automatically loading device status information into a network device has been described with reference to particular embodiments shown in the figures. Other embodiments may be envisioned by one of ordinary skill in the art. For example, the invention is applicable to any circuit that enters a sleep state, whether or not the circuit is part of a network. One of ordinary skill in the art may make modifications to the embodiments without departing from the scope of the invention as set forth in the following claims.

What is claimed is:

1. A method of configuring a network device coupled to a network, comprising:

storing keep-alive data in a memory device;

loading the keep-alive data in a buffer upon initialization of the network device;

when the network device is in a sleep state, periodically transmitting the keep-alive data to at least one other device coupled to the network wherein the memory device also stores configuration data for control circuitry of the network device;

wherein the buffer comprises a transmit first-in-first-out (FIFO) buffer, and wherein loading the keep-alive data in the buffer upon initialization of the network device comprises:

reading a first address of the memory;

if contents of the first address comprise a command to load the transmit FIFO reading a next address of the memory, wherein the command to load the transmit FIFO comprises an indication of how many data elements are to be loaded;

writing the contents of the next address to the FIFO, wherein the contents of the next address comprise a data element;

reading a subsequent address in the memory; and if contents of the subsequent address comprise a data element, writing the contents of the subsequent address to the FIFO.

2. The method of claim 1, wherein loading the keep-alive in the buffer upon initialization of the network device further, if the contents of the subsequent address comprise an initialization done command, ceasing to write contents of addresses of the memory.

* * * * *